United States Patent [19]

Shambayati

[11] Patent Number: 5,297,427
[45] Date of Patent: Mar. 29, 1994

[54] WIDE-RANGE LAMINAR FLOWMETER

[75] Inventor: Ali Shambayati, Tucson, Ariz.

[73] Assignee: Alicat Scientific, Inc., Tucson, Ariz.

[21] Appl. No.: 940,144

[22] Filed: Sep. 3, 1992

[51] Int. Cl.$^5$ .............................................. G01F 5/00
[52] U.S. Cl. ...................................................... 73/203
[58] Field of Search ...................... 73/202, 202.5, 203, 73/861.62

[56] References Cited

U.S. PATENT DOCUMENTS

| | | | |
|---|---|---|---|
| 1,924,125 | 8/1933 | Linderman, Jr. | 73/861.62 |
| 1,946,275 | 2/1934 | Collins | 73/202 |
| 2,297,408 | 9/1942 | Hardebecit | 73/202 |
| 2,591,195 | 4/1952 | Picciano | 73/202.5 |
| 3,805,610 | 4/1974 | Jacobs | 73/202.5 |
| 3,838,598 | 10/1974 | Tompkins . | |
| 4,118,973 | 10/1978 | Tucker et al. . | |
| 4,366,719 | 1/1983 | Bohm et al. | 73/203 |
| 4,418,568 | 12/1983 | Surman | 73/202.5 |
| 4,427,030 | 1/1984 | Jouwama . | |
| 4,461,173 | 7/1984 | Olin . | |
| 4,497,202 | 2/1985 | Mermelstein . | |
| 4,524,616 | 6/1985 | Drexel et al. . | |
| 4,800,754 | 1/1989 | Korpi . | |

Primary Examiner—Herbert Goldstein
Attorney, Agent, or Firm—Baker & Botts

[57] ABSTRACT

An adjustable laminar flowmeter is disclosed for use in fluid flow measurement. The flowmeter comprises a plurality of paths, at least one of which has at least one dimension which is adjustable by means of an adjustment mechanism. A measuring device is located in operative relation with at least one of said paths to measure a characteristic of the flow through that path. By maintaining laminar flow, the ratio of fluid flow through the paths is linear for a wide range of flows. This allows for a simple straight-line approximation of the flow for a wide range of flow. Also, the full scale flow rate through the device is user adjustable. The symmetrical design of the flowmeter enables bi-directional flow measurement.

12 Claims, 8 Drawing Sheets

WIDE-RANGE LAMINAR FLOWMETER

BACKGROUND OF THE INVENTION

1. Field of the Invention

The present invention relates to a wide-range fluid flow measuring device and, more particularly to an adjustable laminar flowmeter which maintains low Reynolds numbers for a wide range of flow.

2. Description of the Prior Art

In general, laminar flowmeters which use the linear relationship between the flow rate and some characteristics of the fluid, such as the change in static pressure or rate of heat transfer, are known. The details of their operation are well known to those of ordinary skill in the art. As is also known, to produce and maintain laminar flow through such a measuring device certain criteria have to be met. One of the most important criteria is the relationship between mean fluid velocity and certain dimensions of the fluid passage. Extensive studies have been conducted to characterize these properties and the most widely used characterization is referred to as the Reynolds number. The Reynolds number is a dimensionless parameter and is based on the results of an investigation of fluid flow in pipes in 1883 by Osborne Reynolds (and subsequent experimentation). Based on this work, it has been determined that for smooth pipes the transition from a laminar to turbulent boundary layer occurs when the ratio of $ud\rho/\eta a$ becomes larger than approximately 2000, where u is the mean velocity of the fluid, d is the characteristic linear dimension of the pipe, $\rho$ is the density of the fluid, and $\eta a$ is the absolute viscosity of the fluid. If the above condition can be maintained for the flow range of interest through the measuring device, the advantages of the linear relationships discussed above can be realized. For example, for laminar flow, the radio between the static pressure drop and the fluid flow rate is linear. The ratio between heat transfer and the fluid flow rate is also linear. A more detailed discussion of the characteristics and requirements of laminar flow will not be provided here since such information is well known in the art.

In general, a laminar flowmeter may comprise a first flow path (or paths) for a main body of flow and a second flow path (or paths) which may be used for purposes of measuring one or more flow characteristics. The first flow path may correspond to a main (undiverted) flow and the second flow path may correspond to a secondary (diverted) flow path. Preferably, there is a selectable predetermined ratio between the volume of diverted to undiverted flow. An advantage to be obtained by maintaining laminar flow is that the flow rate can be calculated based on only a small portion of the fluid by diverting that portion through the measurement passage (e.g., the second flow path) and applying a constant factor corresponding to the ratio of diverted to undiverted flow. This eliminates the need for look-up tables to provide the actual flow rate versus an indicated output. However, it is also desirable to be able to control the ratio of flow in the main and secondary flow paths. Attempts have been made to enable control over this ratio of flow, but they have not been completely satisfactory.

In high-volume manufacturing, where an objective is to mass produce parts with consistent dimensions, the cost vs. accuracy ratio becomes significant, especially when the tolerances are tight as in the case of the fourth power dependency of pressure drop to a pipe radius. Therefore, it is desirable to be able to mass produce the basic flow element by molding, for instance, and make provisions for adjustment at a later stage.

Many flow measuring devices have attempted to maintain low Reynolds numbers to take advantage of the linear relations discussed above to enable a simple straight-line approximation to calculate the flow rate. One example of such a device is disclosed in U.S. Pat. No. 3,838,598 issued to Tompkins. Tompkins teaches using a plurality of capillaries to create laminar flow through the measuring device and using differential static pressure information to calculate the flow rate. However, capillary flow pipes are difficult to efficiently mass produce and once fabricated, they do not easily lend themselves to adjustment in the effective diameter. Another approach is found in U.S. Pat. No. 4,118,973 issued to Tucker et al. In Tucker, grooves of rectangular cross section are machined into plates and by varying the width of the channels and/or by stacking a number of plates, the effective diameter of the element can be varied while low Reynolds numbers are maintained. Alternative designs are proposed by Jouwama in U.S. Pat. No. 4,427,030 and by Mermelstein in U.S. Pat. No. 4,497,202, where the laminar flow element is placed in the bypass and only a small portion of the flow is diverted through the primary passage for measurements. Adjustment of the diversion ratio in flowmeters of this type is achieved by changing the plates that make up the bypass. This is also inefficient. Another design for an adjustable laminar flow element is disclosed by Korpi in U.S. Pat. No. 4,800,754. In Korpi, one cylindrical piece with multiple longitudinal grooves replaces the stacked plates used by Jouwama and Mermelstein. These grooves are blocked off by the webbing on the input side and coarse adjustment in the diversion rate is achieved by the removal of the webbing. A mechanism for fine adjustment in the diversion ratio is also provided. U.S. Pat. No. 4,461,173 issued to Olin discloses a multirange flowmeter in which a multi-position valve is located in the primary passage to divert all or a portion of the flow to the secondary passage.

An adjustable laminar flow bypass which lends itself to field adjustment is disclosed by Drexel et al. in U.S. Pat. No. 4,524,616. Drexel discloses a frusto-conical adjustable laminar flow bypass restrictor within a conically tapering bore to form a conduit which is allegedly capable of maintaining laminar flow and which is said to be adjustable to form annuli of varying thicknesses to allow proper sensor calibration over a wide range of flow rates. At Cols. 1-2 of Drexel, a summary of certain considerations relevant to adjustable, laminar flowmeters is provided.

However, certain drawbacks exist with respect to Drexel. For example, in Drexel, restrictor 72 is secured by a coiled spring member 110 which abuts shoulder 52. Procession and regression of the restrictor in the direction of flow causes a change in the thickness of annular gap 108. In this arrangement, the character of the flow is a function of the cube of the gap thickness. As stated in Drexel, this means that the perimeter surface of the flow restrictor and the surface of the frusto-conical bore should be as concentric as possible to ensure even laminar flow throughout the range of adjustment.

Several problems occur with this adjustment scheme. One is the inability to achieve satisfactory adjustment resolution for lower flow rates. In part this is due to the fact that the adjustment mechanism is not a linear function of the number of screw turns. Another is that turbulence may be created if certain precautions are not taken. Additionally, precise manufacturing tolerances must be set to ensure linearity over a wide range. Moreover, it appears that the adjustment screw is positioned such that an adjustment tool has to be inserted through either the inlet or outlet of the flowmeter. This means the flowmeter may need to be removed to readjust it. Various other drawbacks also exist.

SUMMARY OF THE INVENTION

Based on at least the foregoing, it is readily apparent that there is no convenient, economical and effective device for achieving a wide-range adjustable laminar flowmeter.

It is one object of the present invention to provide means for conveniently adjusting the amount of bypassed fluid in a laminar flowmeter.

It is another object of the invention to provide an adjustable laminar flowmeter having a flow element which has a symmetrical design to provide identical performance regardless of the direction of fluid flow therethrough.

It is another object of the invention to provide an adjustable laminar flowmeter in which the incremental resolution of the amount of bypassed fluid is infinitesimal and in which no hysteresis is introduced when the direction of flow is reversed.

According to one embodiment of the invention there is provided an adjustable laminar flowmeter comprising a housing having an input port and an output port and a plurality of channels formed therebetween to define a plurality of flow paths through the housing. The channels are preferably of substantially rectangular cross-section with predetermined geometries to thereby provide a main fluid bypass in parallel with a single channel of substantially smaller fluid entry area where the actual measurement of fluid flow is performed. The dimensions of the fluid passage channels are such that for a given fluid viscosity, laminar flow is guaranteed and therefore the ratio of flow through the bypass section and the measurement section reamins linear. Because of the laminar flow through the fluid passage, the static pressure drop along the pipe is linearly proportional to the rate of flow.

In one embodiment, adjustment of the full scale flow rate is provided by one or more flat plates which are movable into and out of one or more of the channels, thereby decreasing or increasing the effective width of the channels, respectively, while maintaining the same maximum pressure drop and Reynolds number for the selected range. The plates are moved to cause a predetermined ratio of flow to exist between the plurality of channels. The channels can be stacked to allow for higher maximum flow rates through the flowmeter. Advantageously, these plates move perpendicular to the direction of flow.

Another advantage of the present invention is that the flow bypass is field re-adjustable, so that it can be conveniently adjusted by the user to enable different ranges of full scale flow, and therefore allow one instrument to serve the function of what would normally require a number of different models of flowmeters. Also, the adjustment may be linearly related to the movement of an adjustment mechanism.

Yet another advantage of having a wide range of adjustment is that only one model has to be manufactured and the inventory cost can therefore be reduced. Different "models" can be created simply by adjusting the bypass at a desired flow rate. Additionally, the use of one model enables the calibration and adjustment procedures to be easily automated.

Yet another advantage of the adjustable laminar flowmeter is that it can be calibrated independent of the electronics, where accuracies of 1 percent or better can usually be achieved by fixed components.

Yet another advantage of this adjustable laminar flow element is that it can be replaced by the user, if it is degraded due to corrosion or clogging, for instance, with another factory-calibrated unit, without effecting the calibration of the instrument, since the electronic circuitry of the instrument is usually not susceptible to large drifts. This in turn benefits both user and supplier by eliminating labor costs associated with re-calibration of the flowmeter.

Yet another advantage of the present invention is that it observes symmetry to provide identical results regardless of the direction of flow.

DETAILED DESCRIPTION OF THE PREFERRED EMBODIMENT

Details of illustrative embodiments of the present invention are disclosed. However, it is to be understood that these preferred embodiments merely exemplify the invention which may take forms different from the specific embodiments disclosed. The drawings and any dimensions provided are for the purpose of illustration. The invention is not limited to these specifics.

Figure 1:
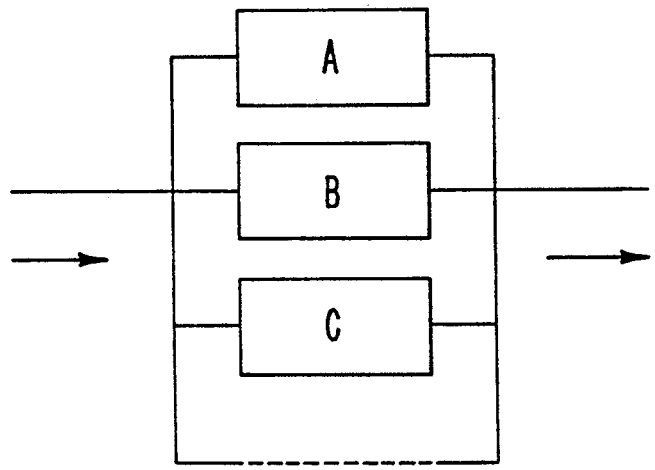
FIG. 1 is a schematic representation of fluid paths through a flowmeter.

FIG. 1 shows a schematic representation of fluid paths through a flowmeter. Path A represents a passage (or flow path), for example, the passage through which the measurement is performed, and paths B, C, . . . , represent the main passage. If the flow through all paths is laminar, the ratio of the volume of fluid flowing through paths A, B, C, . . . is constant and the flow rate can be determined based on the measurement performed on only one path, e.g. A, by applying a constant factor to it. The constant factor is determined by the ratio of flow through the measurement path and the bypass path(s). However, if the flow through any path becomes turbulent, the entire system becomes nonlinear and the flow rate can no longer be accurately calculated by applying a constant factor to the measured portion of the fluid.

Figure 2:
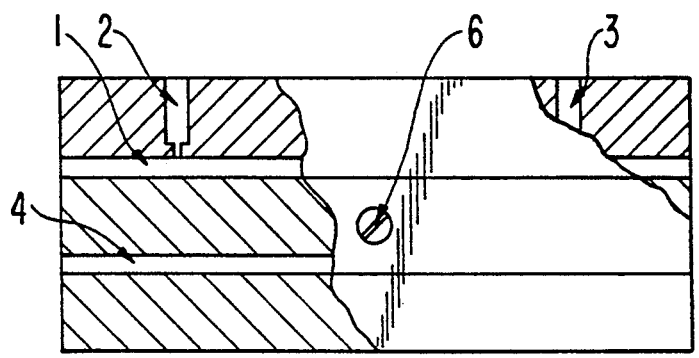
FIG. 2 shows a side view of one aspect of an embodiment of the present invention.

FIG. 2 illustrates various aspects of one embodiment of the present invention using the general principles shown in FIG. 1. In this embodiment, fluid flowing through the flowmeter is divided into two portions. The measurement path 1 corresponds to Path A in FIG. 1. The static pressure drop (or other characteristics) of the flow through path 1 is measured by a measuring device as indicated by elements 2 and 3, for example, in a known manner. The rest of the fluid flows through path 4 which corresponds to paths B, C . . . , in FIG. 1. Element 6 depicts an adjustment mechanism which will be described in more detail below.

Figure 3:
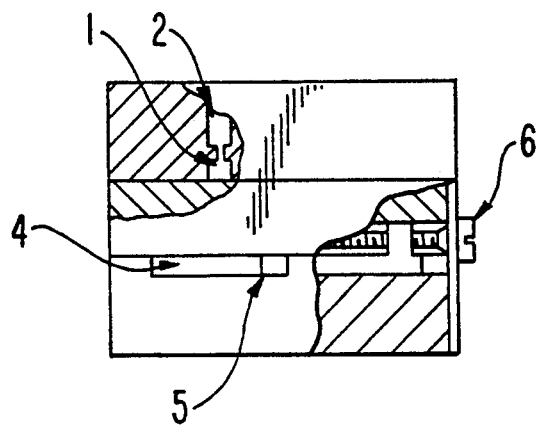
FIG. 3 shows a front view of one embodiment of a fluid entry section of the present invention.

FIG. 3 shows an example of a front view of a fluid entry section of a flowmeter such as the one depicted in FIG. 2. As shown in FIG. 3, adjustment mechanism 6 is operable to position a flow adjustment mechanism 5 at a desired position to adjust the amount of flow through path 4. The flow adjustment mechanism 5 can be used to establish a predetermined ratio of flow between the measurement path 1 and the path(s) 4. For purposes of example, adjustment mechanism 6 is shown as a screw-type adjustment mechanism which is operably connected to a plate 5 which serves as the flow adjustment mechanism 5. Of course, it will be understood that various other combinations of mechanisms may be used for these elements. As the plate 5 moves inside the channel 4 by means of the screw 6, the width of the channel decreases, and therefore the amount of fluid through path 4 can be reduced. In operation, adjustment mechanism 6 is manipulated to set the flow adjustment mechanism 5 to a desired position so that a predetermined ratio of flow enters path 1 and path 4. As flow passes through path 1, one or more characteristics of the flow are measured by a measuring device. For example, static pressure may be measured, by a pressure measuring apparatus. In this embodiment, plate 5 moves in a direction perpendicular to the direction of flow through path 4. also, movement of the plate, and therefore the width of path 4, is linearly related to the rotation of the adjustment mechanism (e.g. screw) 6. The dimensions of path 1 in this embodiment are fixed.

Figure 4:
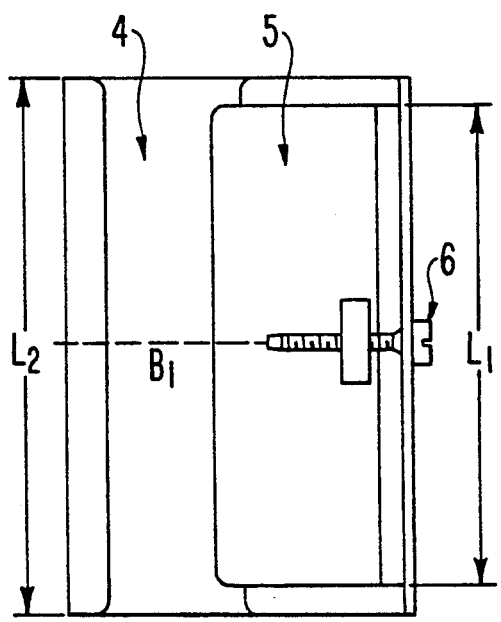
FIG. 4 shows a top view of one embodiment of a fluid bypass section and adjustment plate of the present invention.

FIG. 4 shows a top view of the fluid bypass section 4, the flow adjustment plate 5 and the screw-type adjustment mechanism 6. As can be seen from this view, the plate 5 may be an elongate, substantially rectangular plate which has a length $L_1$ substantially equal to the length $L_2$ of the path 4. The entry and exit walls to path 4 and the corners of plate 5 are preferably rounded to minimize flow disturbance effects. As explained below, the device is designed so that the fluid can only flow through paths 1 and 4. Moreover, the plate 5 is substantially symmetrical with respect to a bisector $B_1$ (shown in dashed lines in FIG. 4) of the path 4.

Figure 5:
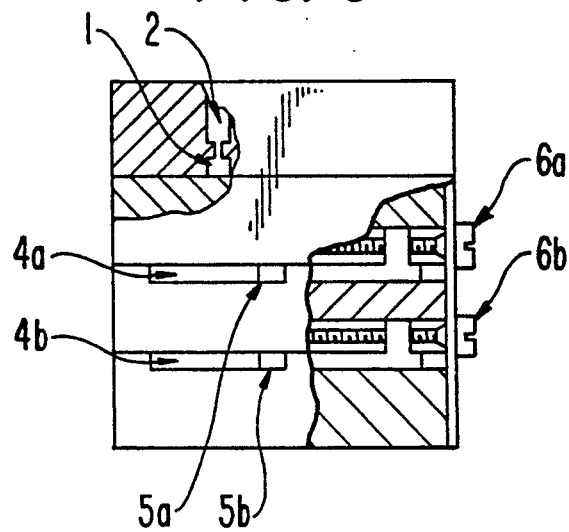
FIG. 5 shows a front view of two adjustable channels according to one embodiment of the present invention.

FIG. 5 shows an alternative embodiment wherein two bypass channels, 4a, 4b are provided to double the effective adjustment range. Paths 4a and 4b are provided with plates 5a, 5b, respectively and adjustment mechanisms 6a, 6b to provide independent adjustment of the width of paths 4a, 4b. Having multiple bypass channels results in higher full scale flow ranges. Adjustment may be provided for all or some of the bypass grooves. For example, if five bypass channels of equal width are provided and only an adjustment of 20% is desired, then only one bypass channel needs the adjustment mechanims. On the other hand, if an adjustment of 0-100% is needed then the adjustment mechanism for all five channels may be used.

Figure 6:
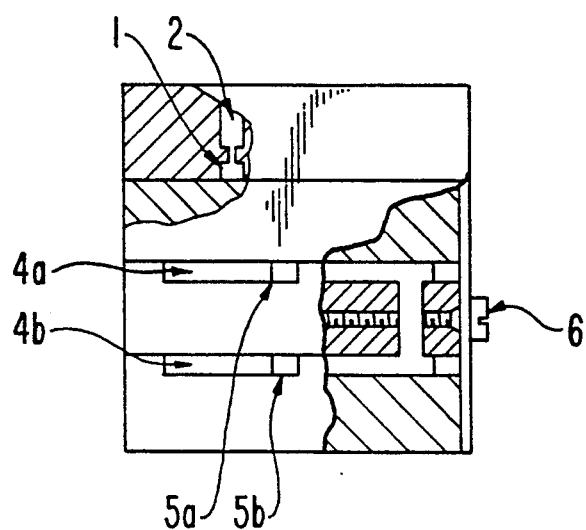
FIG. 6 shows an alternative embodiment to that shown in FIG. 5 in which a single adjustment mechanism is used to move a plurality of plates.

FIG. 6 shows another alternative embodiment. In this embodiment, one adjustment mechanism 6 is used to move a plurality of plates 5a, 5b to adjust the width of paths 4a, 4b. More than two plates can be attached together and more than two paths may be used to provide a larger passage for the bypassed fluid. The preferred method simply depends on the desired adjustment resolution which is determined in part by the thread size of the adjustment screw 6.

Figure 7:
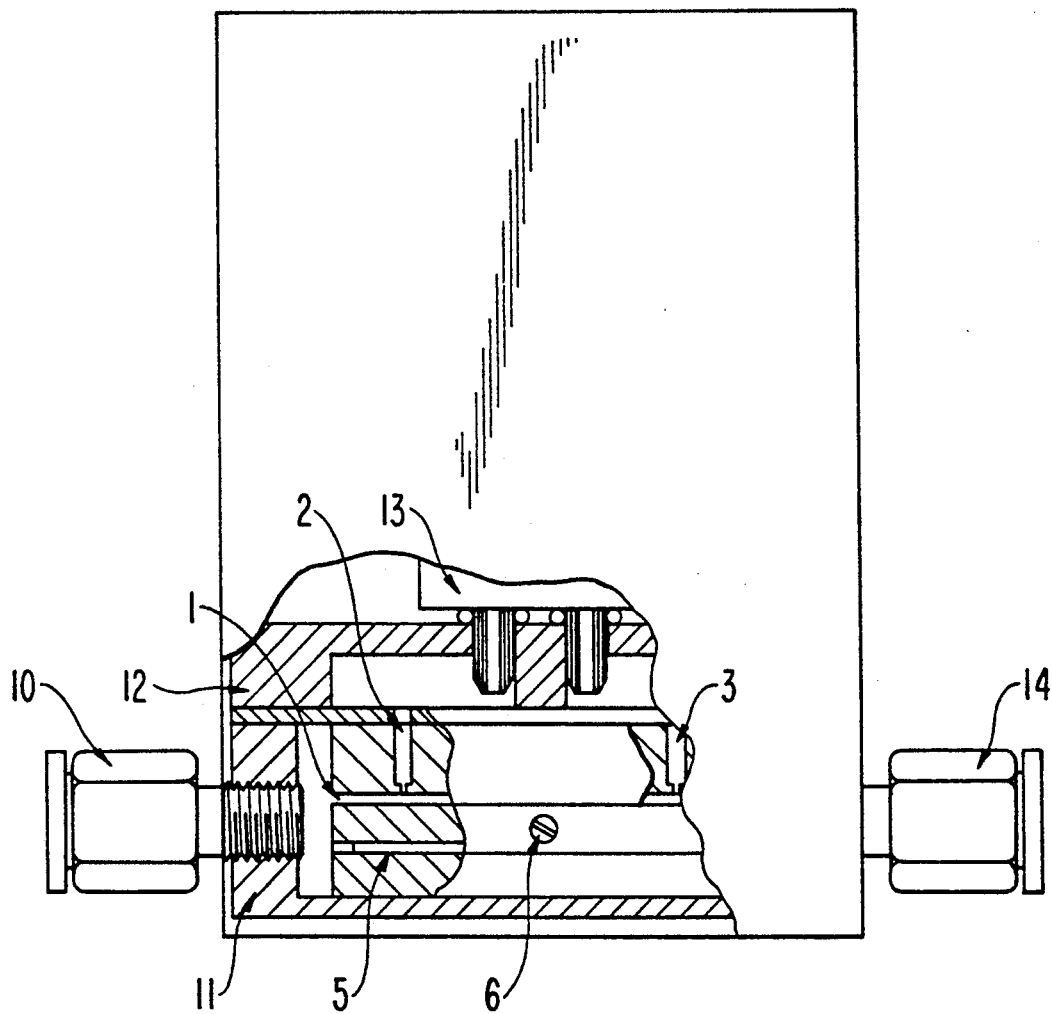
FIG. 7 shows one embodiment of the present invention used in conjunction with a differential pressure transducer to provide a volumetric flowmeter.

FIG. 7 shows an example of a flowmeter according to the present invention. As shown, the invention is used in conjunction with a differential pressure transducer 13 to provide a volumetric flowmeter. Other measurement devices and configurations are possible. In the embodiment shown, the fluid passes through the flowmeter by entering the fitting 10 (or 14). Since the flow path is constrained by the case 11 and the top 12, all of the fluid flows through the measurement path 1 and one or more bypass paths. Eventually, all of the fluid is recombined and recovered upon exiting fitting 14 (or 10). The static pressure drop created by the fluid flow in path 1 through the laminar flow element is measured by the pressure taps 2 and 3 of differential pressure transducer 13. The pressure taps 2 and 3 are preferably located far enough from the inlet of measurement path 1 to ensure that laminar flow has been established. The output of the pressure transducer 13 is amplified and scaled to represent the volume of fluid flowing per unit time and is adjusted so that it produces a negative output if the flow direction is reversed. With this configuration, an output of zero volt indicates no flow, a positive voltage output indicates flow entering fitting 10 and exiting fitting 14 and a negative voltage output indicates flow entering fitting 14 and exiting fitting 10.

Figure 9:
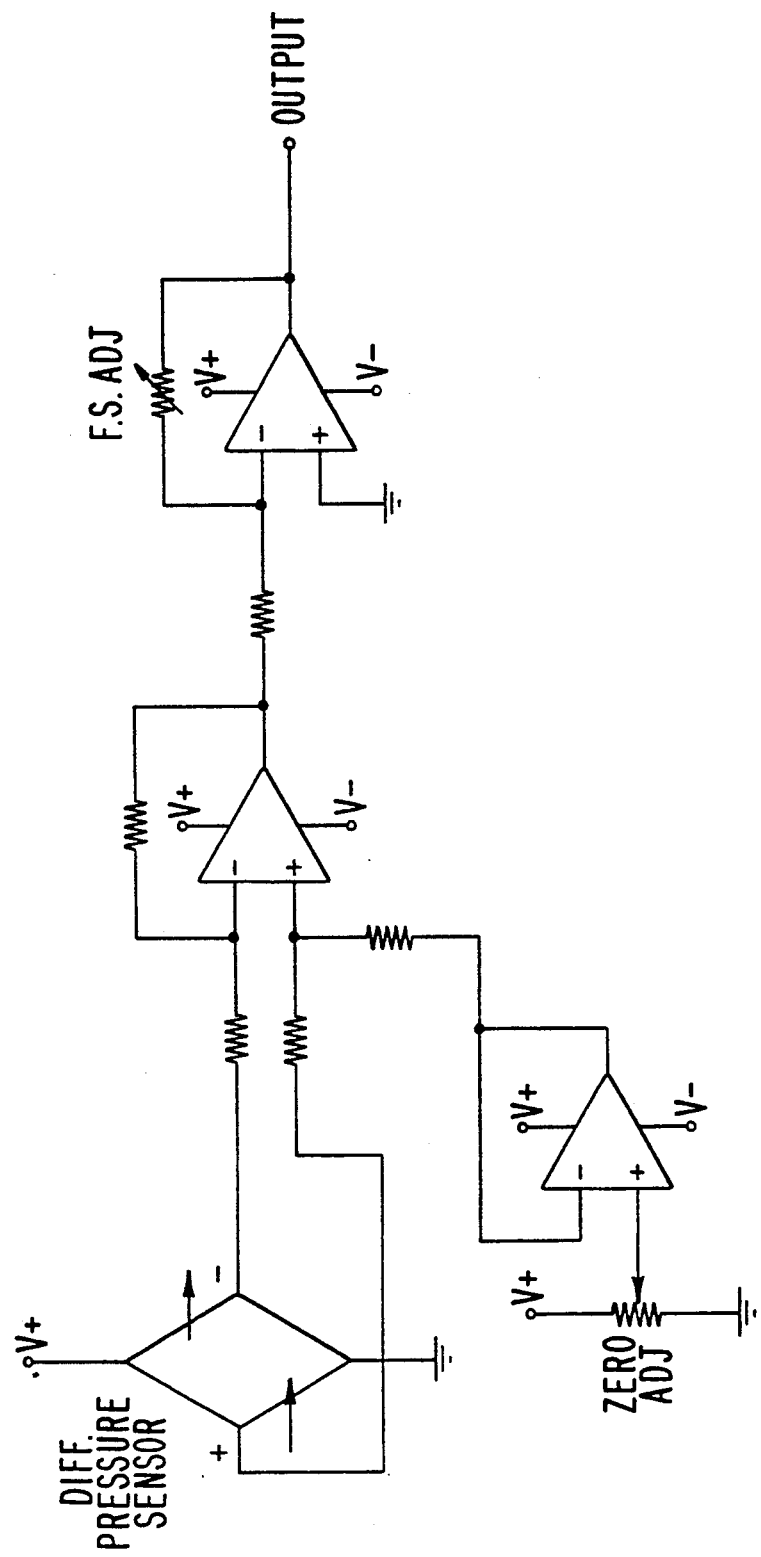
FIG. 9 is an example of a schematic of a circuit which may be used with various embodiments of the present invention.

The dimensions of the laminar flow elements are determined based on the fluid viscosity and flow rate. Such dimensions will be readily apparent to one of skill in the art. For one example, see U.S. Pat. No. 4,118,973 where the dimensions of rectangular grooves are discussed in detail. FIG. 9 depicts an example of circuitry which may be connected to the measurement device, e.g., the one depicted in FIG. 7.

The output of the differential pressure sensor is amplified and scaled to represent the flow rate per unit time. For example, the amplifier gain may be adjusted so that positive 5 volts indicates flow rate of 5 liters per minute in one direction, and negative 5 volts indicates flow rate of 5 liter per minute in the opposite direction. With this circuit, an output of 2 volts indicates 2 liters per minute, since the system is linear. The circuit can easily be modified to provide other types of output such as 4-20 mA current loop, frequency output, and digital output by utilizing a microprocessor, details of which are known to those skilled in the art.

The calibration of the adjustable laminar flow element of the present invention will now be described, assuming that it is used in conjunction with a differential pressure measuring system, herein referred to as differential pressure transducer, and a previously calibrated flowmeter, herein referred to as a reference flowmeter. However, methods other than differential pressure measurement can also be used. One example of a calibration procedure is as follows. The reference flowmeter is connected in series with the adjustable laminar flowmeter and fluid is circulated in the system by means of a pump. The adjustment mechanism 6 of the adjustable flowmeter is turned until the pressure transducer output matches that of the reference flowmeter. Since the flow is laminar, it is not critical that the flow through the system be set at any particular values, as long as it does not exceed the full scale rated flow of the reference flowmeter. Once this stage is completed, the calibration process is finished.

A significant advantage of this flowmeter is that only one measurement is needed to calibrate the flowmeter for the entire range of flows. This procedure can easily be adapted to calibrate the adjustable laminar flow element for full scale readings other than that of the reference flowmeter.

Figure 8:
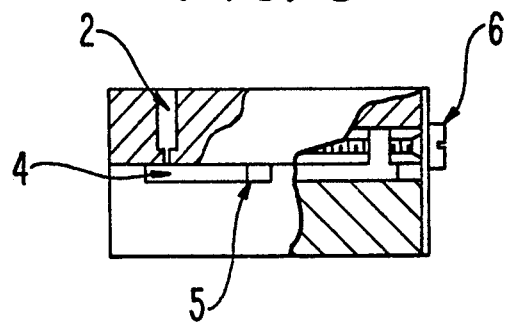
FIG. 8 shows an aspect of an alternative embodiment of the present invention.

FIG. 8 is an alternative embodiment wherein path 1 is combined with path 4, thereby creating a single path through the laminar flow element.

Figure 12:
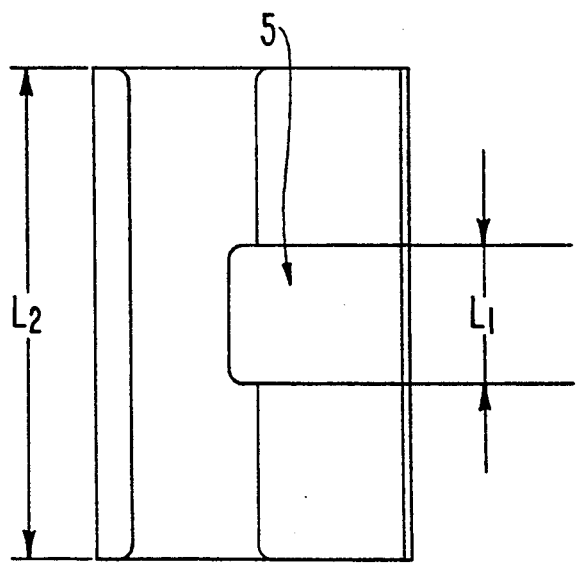
FIG. 12 shown an alternative embodiment of the present invention.

In any of the foregoing embodiments, instead of using a plate 5 of length ($L_1$) which is substantially as long as path ($L_2$), a plate of shorter length may be sufficient as shown in FIG. 12. As known in the prior art, in order to establish laminar flow in a rectangular pipe the ratio between the length and depth of the pipe has to be large. Therefore, the above dimensions ($L_1$ and $L_2$) can be varied as desired. In doing so one should be aware that inaccuracies due to velocity effect and local disturbances may be introduced by shorter lengths of $L_1$ and $L_2$, which may or may not fall within the specified accuracy and linearity of the instrument.

Figure 10:
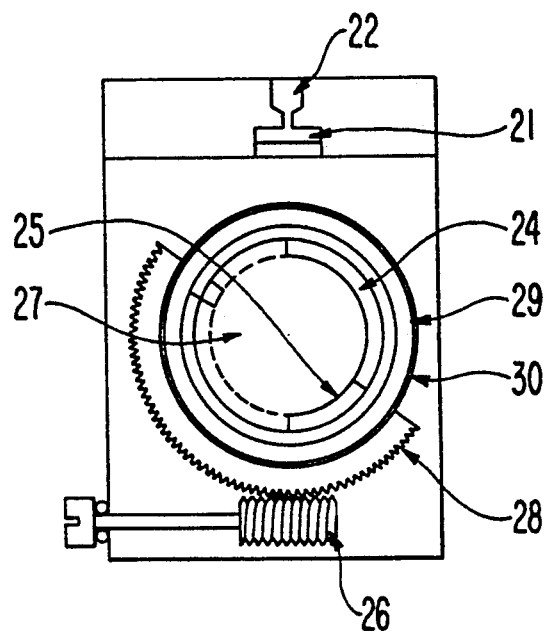
FIGS. 10, 10a and 10b show an alternative embodiment of the present invention.
Figure 10A:
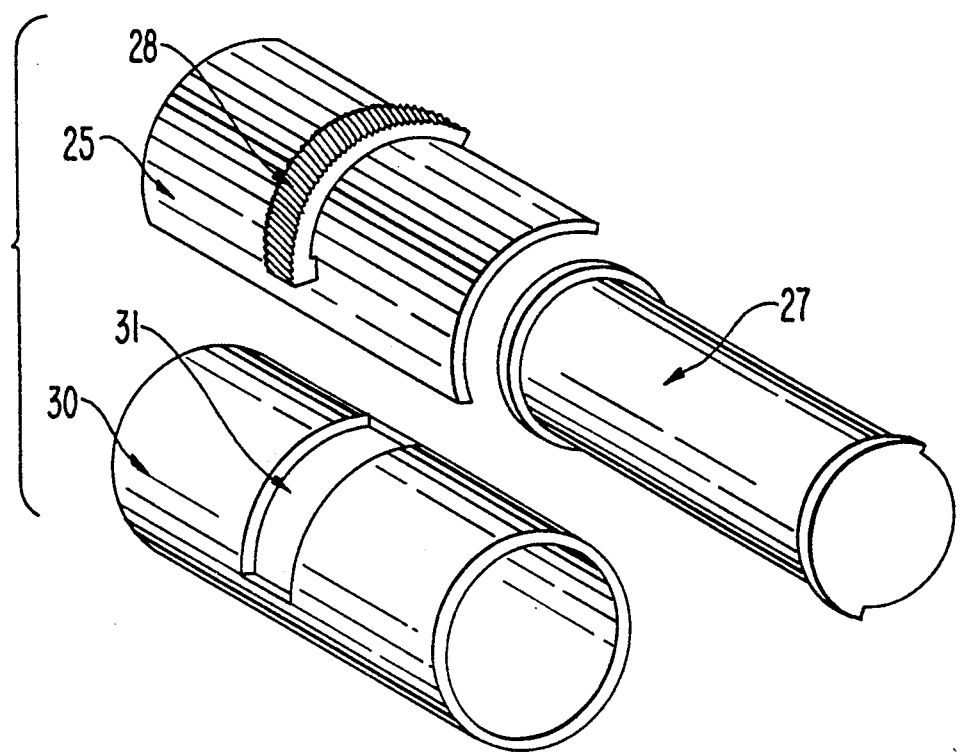
Figure 10B:
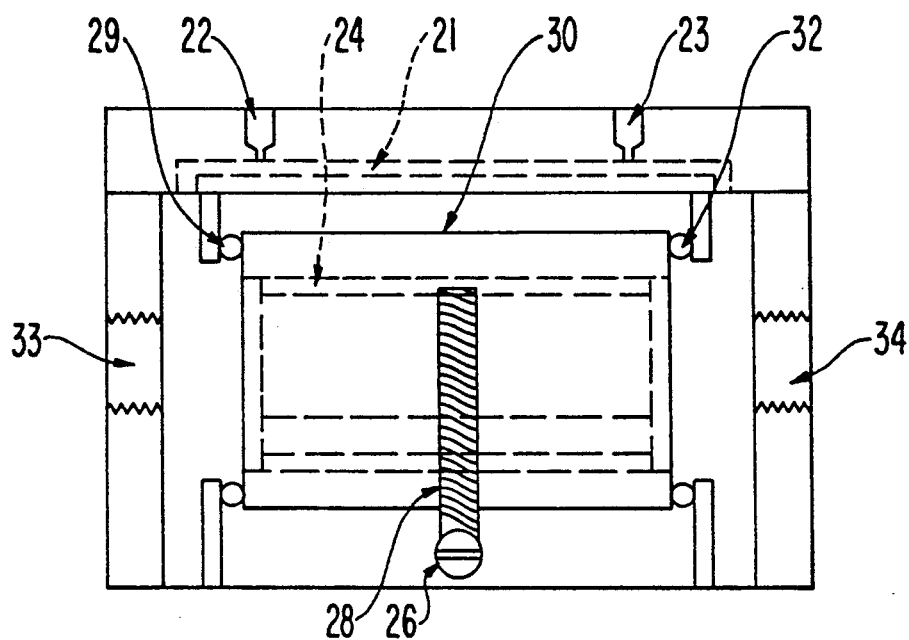

FIGS. 10, 10a and 10b show another embodiment of the adjustable laminar flow element. Referring to FIGS. 10 and 10a, a rotatable plate 25 is provided to adjust the width of flow path 24. The plate 25 is rotated by worm gear mechanism 26 and 28 to adjust the effective width of the flow path 24. A spindle 27 fits inside a tube 30, with the plate 25 sandwiched therebetween. Gear 28 is expose through a slot 31. In FIGS. 10, 10a and 10b, the thickness of the adjustment plate 25 is shown to be the same as the gap produced by placing spindle 27 inside tube 30. However, this need not be true for all cases, so long as provisions are made to prevent fluid leakage to the outside of the tube 30. Also, the depth of the gap 24 is selected such that laminar flow through the passage 24 is guaranteed.

Figure 11:
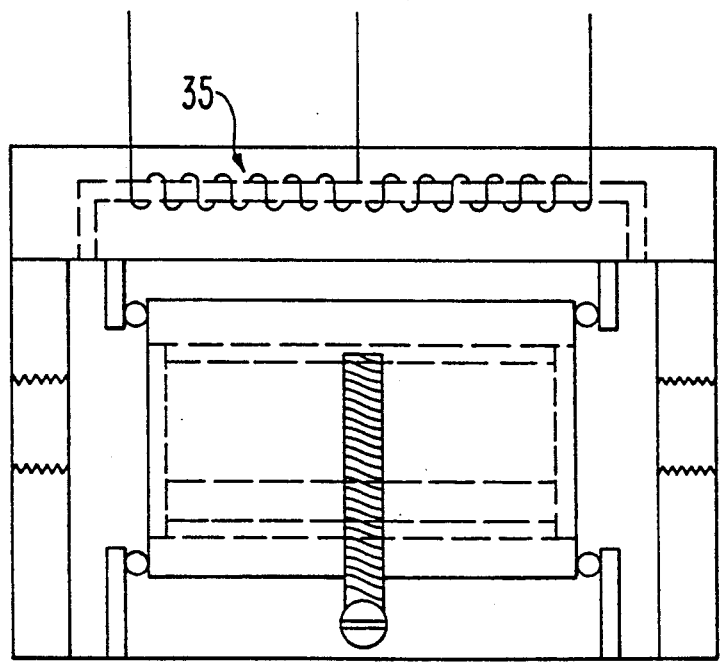
FIG. 11 shows an example of the present invention used to measure mass flow.

FIG. 10b shows a side view of this embodiment. Fluid enters through either fitting 33 or 34 and is divided into two portions. The first portion flows through path 21 where the measurement is performed, and the second portion flows through path 24. O-rings 29 and 32 may be provided as a seal so that the fluid cannot flow around the tube 30 and contact the adjustment screw and gear mechanism 26 and 28. Two pressure taps 22 and 23 are shown. If fluid enters fitting 33 and exits fitting 34, the static pressure at point 22 will be higher than that of point 23. FIG. 11 shows an example of this embodiment used in conjunction with a thermal element 35 to measure mass flow, in a manner known in the art.

The foregoing is a description of the preferred embodiments of the present invention. However, the invention is not so limited. Other modifications and variations will be readily apparent to those skilled in the art. For instance, if the reference flowmeter is rated at full scale of 5 liters per minute, and the adjustable flowmeter is to be calibrated for 10 liters per minute full scale, all that is necessary is that the screw 6 be adjusted until the output of the pressure transducer is half that of the reference flowmeter. While the laminar flow element is described with regard to differential pressure instruments, the flowmeter of present invention may also be used with mass flow instruments as desired. Aspects of the various embodiments shown may be used with other embodiments. For simplicity, not all permutations of these features have been shown. The invention is only limited by the claims appended hereto.

I claim:

1. An adjustable laminar flowmeter comprising:

a housing;

a plurality of fluid paths located in said housing including at least a first fluid path and a second fluid path;

an adjustment mechanism for adjusting at least one dimension of at least one of said first and second fluid paths to cause a predetermined ratio of a flow to pass through said at least one fluid path in a flow direction; and measurement means operatively positioned with respect to at least one of said first and second flow paths to measure a characteristic of the flow through said flow path;

wherein said adjustment mechanism comprises a plate which is linearly movable in a direction perpendicular to the flow in said first or second flow path and said plate extends in a longitudinal direction which is parallel to the flow direction and is adjustable in a direction perpendicular to the flow direction.

2. The flowmeter of claim 1 wherein said plate extends in a longitudinal direction which is parallel to the flow direction and said adjustment mechanism further comprises a screw type adjustment mechanism to enable to user to move said plate perpendicular to the direction of flow through said first or second flow path.

3. The flowmeter of claim 1 wherein said plate has a length in a longitudinal direction, said fluid flow paths have a length and the length of said plate is less that the length of said fluid flow paths.

4. The flowmeter of claim 1 wherein said plate has a length in a longitudinal direction, said fluid flow paths have a length and the length of said plate is substantially equal to the length of said fluid flow paths.

5. An adjustable laminar flowmeter comprising:

a housing;

a plurality of fluid flow paths located in said housing including at least a first fluid flow path and a second fluid flow path, wherein at least one of said fluid flow paths comprises substantially parallel walls and at least one dimension which is linearly adjustable, said at least one fluid flow path providing laminar flow in a flow direction therethrough for a given fluid viscosity;

an adjustment mechanism for linearly adjusting at least one dimension of said at least one fluid flow path to cause a predetermined ratio of a flow to pass through said plurality of fluid flow paths wherein said adjustment mechanism comprises a plate which extends in a longitudinal direction parallel to said flow direction and said plate is adjustable in a direction perpendicular to said flow direction; and measurement means operatively positioned with respect to said at least one fluid flow path to measure a characteristic of the flow therethrough.

6. The flowmeter of claim 5 wherein the adjustment mechanism comprises a plurality of plates each of which is located in one of said plurality of fluid flow paths, and further wherein said plurality of plates are independently adjustable.

7. The flowmeter of claim 6 wherein said first and second fluid flow paths each have a width and said widths are different.

8. The flowmeter of claim 6 wherein said first and second fluid flow paths each have a width and said widths are substantially equal.

9. The flowmeter of claim 5 wherein said adjustment mechanism comprises a plurality of plates each of which is located in one of said plurality of fluid flow paths and further wherein said plurality of plates are adjustable by a single mechanism.

10. The flowmeter of claim 5 wherein said measuring means comprises a differential pressure transducer.

11. The flowmeter of claim 5 wherein said adjustment mechanism has a substantially symmetrical design with respect to a line bisecting the length of at least one of said fluid paths.

12. The flowmeter of claim 5 wherein said measurement means comprises a mass flow sensor.

* * * * *